United States Patent [19]

Steininger

[11] Patent Number: 4,965,915
[45] Date of Patent: Oct. 30, 1990

[54] PLUG FOR THE BEARING OF AN AUTOHOIST ARM AGAINST A MOTOR-VEHICLE BODY

[75] Inventor: Gerd Steininger, Bobligen, Fed. Rep. of Germany

[73] Assignee: Daimler-Benz AG, Fed. Rep. of Germany

[21] Appl. No.: 359,290

[22] Filed: May 31, 1989

[30] Foreign Application Priority Data

May 31, 1988 [DE] Fed. Rep. of Germany ....... 3818464

[51] Int. Cl.$^5$ .............................. B60S 11/00
[52] U.S. Cl. .......................... 24/607; 24/625; 24/682; 24/694; 24/704.1; 403/289; 403/408.1; 411/41; 411/508
[58] Field of Search ............... 24/625, 614, 615, 606, 24/607, 453, 573, 574, 297, 682, 686, 694, 704.1; 403/408.1, 289; 411/41, 508, 509, 510, 383, 395, 913, 396

[56] References Cited

U.S. PATENT DOCUMENTS

| 3,393,599 | 7/1968 | Fisher | 411/41 |
| 4,231,279 | 11/1980 | Theorot | 411/396 |
| 4,579,473 | 4/1986 | Brugger | 24/453 X |
| 4,729,606 | 3/1988 | Narita et al. | 24/297 X |

FOREIGN PATENT DOCUMENTS 3532375 8/1986 Fed. Rep. of Germany .

*Primary Examiner*—James R. Brittain
*Attorney, Agent, or Firm*—Evenson, Wands, Edwards, Lenahan & McKeown

[57] ABSTRACT

A plug for the bearing of an autohoist arm on a motor-vehicle body comprises an elastic receiving part secured in a receiving orifice and a dimensionally stable spacer piece located in front of and clipped securely to the receiving part. A common passage bore is provided in the receiving part for receiving a retention peg which secures both the receiving parts and the spacer piece in the receiving orifice by nose-shaped forms at its ends. The position of the retention peg is fixed by a locking pin.

10 Claims, 1 Drawing Sheet

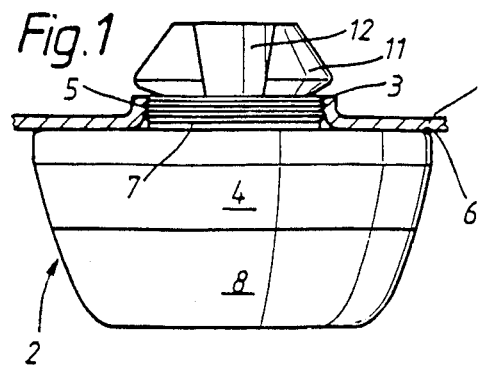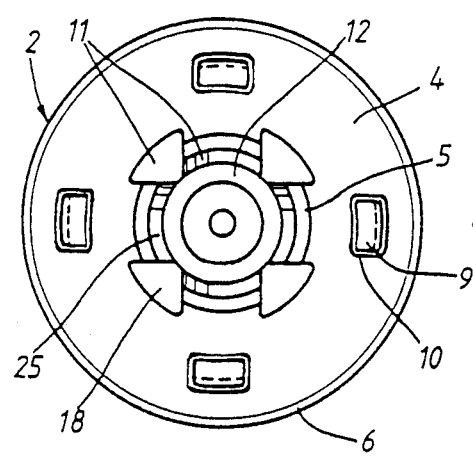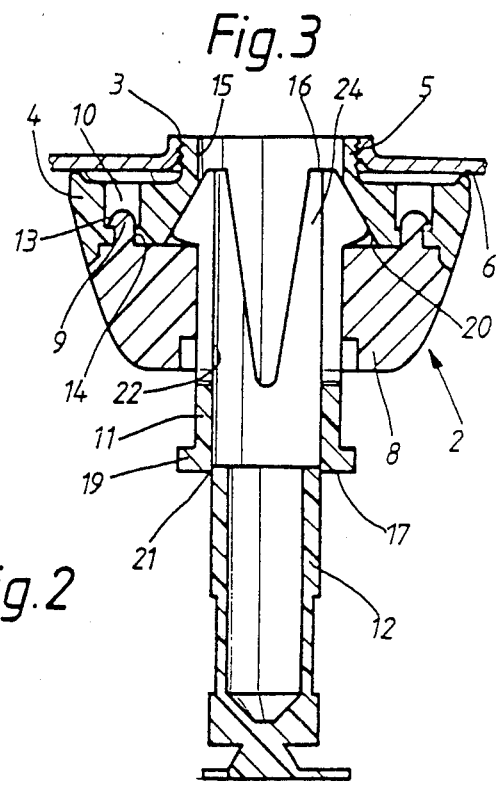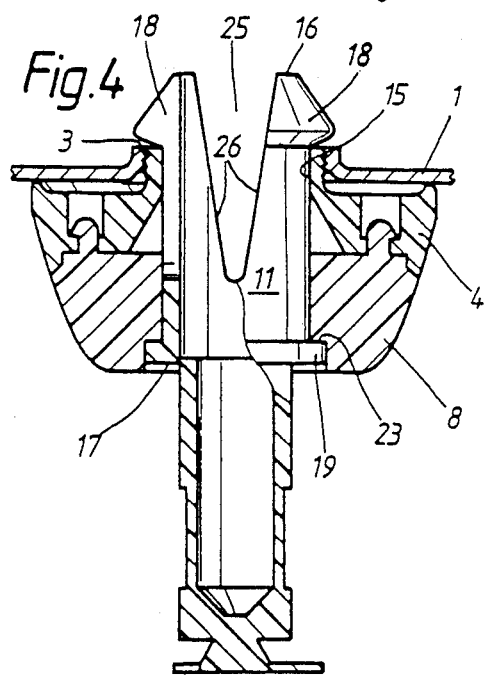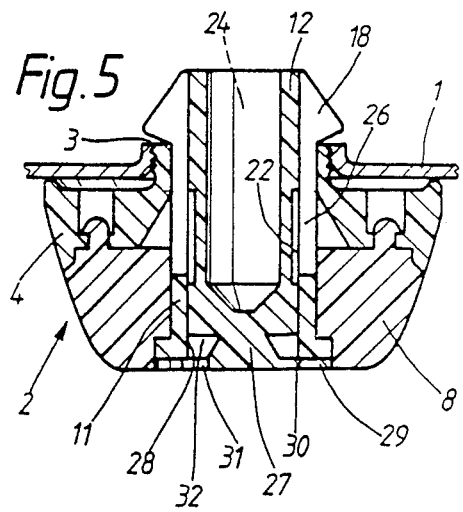

PLUG FOR THE BEARING OF AN AUTOHOIST ARM AGAINST A MOTOR-VEHICLE BODY

BACKGROUND AND SUMMARY OF THE INVENTION

The present invention generally relates to a plug for the bearing of an autohoist arm against a motor vehicle body and more particularly to a plug which is easy to produce yet reliable in operation.

German Pat. specification No. 3,532,375 discloses a plug for the bearing of an autohoist arm against a motor vehicle body having a cap-shaped spacer part which is located in front of a rubber sealing part and which is completely surrounded by elastic material on the inside and outside.

To obtain a permanent intimate connection between the spacer part and sealing part under the loads exerted on the material, stringent demands must be made on the material properties of the parts and the form of the spacer part is relatively complicated.

An object of the present invention is to provide a plug for the bearing of an autohoist arm against a motor vehicle body which is easy to produce and can be firmly secured in a receiving orifice of the vehicle body safely against removal by pulling forces.

These and other objects are achieved by utilizing a retention peg which is elastically deformable for insertion into a receiving part of the plug and is lockable, by a locking pin, against removal once the retention plug is in place to hold the plug in the receiving orifice.

The plug comprises various individual parts, by which a mechanical connection can be made between a spacer piece and the receiving part, and by which the plug can be secured firmly in the receiving orifice of the vehicle body. These individual parts can be produced easily because of their simple design and can be varied independently of one another in terms of their material properties, so that the most inexpensive material can be chosen in accordance with the load exerted on each individual part.

Nose-shaped forms provided at both ends on the retention peg ensure especially high safety against the plug being torn out from the vehicle-body receiving orifice. However, the retention peg must be elastically deformable to allow it to pass through the passage bore in the region located on the inside after assembly. Thus, in according to one embodiment of the present invention this feature is provided by tapered material cutouts which are made axially in the casing of the retention peg to form legs which can be pressed together in the passage bore.

According to certain advantageous embodiments of the present invention, particular attention is given to the design of the outer endpiece of the locking pin. It forms a plane transition to the surface of the spacer piece, as a result of which a good bearing of an autohoist arm can be achieved. Furthermore, it fills the bore orifice of the retention peg, so that no dirt penetrates through the plug and the receiving orifice in the body. Also formed in the outer endpiece of the locking pin is an undercut, by which the locking pin can be pulled out of the retention-peg bore, in order to remove the plug when required.

According to further advantageous embodiments of the present invention, the outer endpiece of the locking pin can also be designed in such a way that, after it has been assembled, it rests against the end face of the retention peg, and consequently it cannot be pressed too far into the retention-peg bore.

According to a further embodiment of the present invention, an advantageous production method involves constructing the locking pin so that it is connected integrally to the retention peg and can therefore be transported with retention peg prior to installation. Only during the installation of the plug is the locking pin separated from the retention peg in the region of connection to permit pressing the locking pin into the retention-peg bar to effect a locking of the retention peg in place.

One particular advantageous feature of the present invention is that for the installation of the plug, it is beneficial, during preassembly to secure the retention peg temporarily, by its nose-shaped form located on the inside in the installed state, in a notch bevelled off from the passage bore of the receiving and spacer pieces. As a result it becomes possible to make the notch in a favorable way if it is located in the region of transition of the two individual parts which is accessible during production.

Other objects, advantages and novel features of the present invention will become apparent from the following detailed description of the invention when considered in conjunction with the accompanying drawings.

BRIEF DESCRIPTION OF THE DRAWINGS

FIG. 1 shows a side view of a plug secured in a receiving orifice of a vehicle body in accordance with one embodiment of the present invention;

FIG. 2 shows a plan view of FIG. 1 without the body panel;

FIG. 3 shows a section side view of a plug according to the embodiment of the present invention at the start of installation;

FIG. 4 shows a sectional, side view of a plug according to the embodiment of the present invention, with the retention peg already pushed through; and FIG. 5 shows a sectional, side view of a plug according to the embodiment of the present invention, corresponding to its final attachment on the body.

DETAILED DESCRIPTION OF THE DRAWINGS

An exemplary embodiment of the invention is illustrated in the drawings.

FIGS. 1 and 2 show a side view with a body panel 1 and a plan view without the body panel 1, respectively, of a plug 2 serving for the bearing of an autohoist arm (not shown) against a motor-vehicle body having a receiving orifice 3, in which the plug 2 is secured by an elastic receiving part 4. The receiving part 4 is pressed into the receiving orifice 3 by a sleeve portion 5, until it comes to bear of the body panel 1 by means of a circular bearing surface 6. Located on the periphery of the sleeve portion 5 are encircling grooves 7, as a result of the arrangement of encircling grooves 7 the receiving orifice 3 can be sealed off against the penetration of water and dirt.

Located in front of the receiving part 4 is a dimensionally stable spacer piece 8 which prevents the plug 2 from being compressed too much by the thrust pressure of the autohoist arm. The spacer piece 8 is snapped in place by four formed-on noses 9 adapted for insertion into cutouts 10 of the receiving part 4 and is additionally held by a retention peg 11 which engages behind the edge of the receiving orifice 3, the position of the retention peg 11 being secured by means of a locking pin 12.

A possible fixing of the plug 2 according to a preferred embodiment of the present invention on a vehicle body will be explained in detail with particular reference to the description of FIGS. 3 to 5.

In FIG. 3, the plug 2 is shown in cross-section in a preassembled condition secured in the receiving orifice 3 by its sleeve portion 5. The spacer piece 8 rests over its surface against the receiving part 4 and, is attached to the receiving part 4 by formed-on noses 9, projecting in the axial direction of the plug 2, which snapped into cutouts 10 of the receiving part 4. The noses 9 have projections 13 which engage the step formed by a narrower portion 14 of the cutouts 10 to retain the noses 9 in the cutouts 10.

The retention peg 11 which, at each end 16, 17, has a radially projecting nose-shaped form 18, 19, is introduced into a common axial passage bore 15 in the receiving part 4 and in the spacer piece 8.

The nose-shaped form 18 at that end 16 of the retention peg 11 located on the inside in the installed state is fixed temporarily, in a transition region between the spacer piece 8 and the receiving part 4, in an encircling notch 20 bevelled off from the passage bore 15.

The locking pin 12 is connected integrally to the retention peg 11 and can be separated from the retention peg 11 in the connection region 21 by severing the material as a result of pressure exerted on the locking pin 12. Once separated, the locking pin 12 can be pressed into an inner bore 22 in the retention peg 11.

In FIG. 4, the retention peg 11 is pressed completely into the passage bore 15 until it bears against a surface 23 of the spacer part 8. In the position shown in FIG. 4, the retention peg 11 engages into the spacer piece 8 by the nose-shaped form 19 at its outer end 17 by the nose-shaped form 18 at its inner end 16. The retention peg 11 further engages behind the receiving part 4 and the edge of the receiving orifice 3 of the body panel 1, in such a way that the spacer piece 8 and the receiving part 4 are fixed axially between these nose-shaped forms 19, 18. Moreover, because the retention peg 11 engages behind the receiving orifice 3, the spacer piece 8 and the receiving part 4 are also held securely on the body panel 1.

So that the retention peg 11 fits with its inner end 16 through the passage bore 15, it is elastically deformable at an inner end region 24.

This is made possible by tapered material cutouts 25 which are made axially in the casing of the retention peg 11 to uniformly subdivide the periphery of the retention peg 11 to form legs 26 which can be pressed together in the passage bore 15.

As a result of this subdivision, at the inner end 16 of the retention peg 11 four individual noses 18 project in a uniform distribution on the periphery of the retention peg 11. So that the noses 18 are locked in a position retaining the plug 2 and engaging the edge of the receiving orifice 3, as shown in FIG. 5, the locking pin 12 is pushed into the bore 22 and into the inner end region 24 of the retention peg 11. It is therefore no longer possible for the noses 18 to deform elastically into the passage bore 15, this feature preventing movement of the retention peg 11 towards the preassembly position of FIG. 3.

The locking pin 12 has an outer endpiece 27, by which it forms a plane transition to the surface of the spacer piece 8, so that the autohoist arm has a flat bearing surface. Furthermore, this endpiece 27 is designed in such a way that it fills the bore orifice 28 of the retention peg 11, thus making it difficult for dirt to penetrate.

The locking pin 12 covers an end face 30 of the retention peg 11 by means of a projecting circular formed-on edge region 29, so that the locking pin 12 cannot be pressed too far into the bore 22.

In a narrow lateral region at this outer end, the locking pin 12 has a rectangular cutout 31 merging into an undercut 32 in the end piece 27, in which is received a pulling-off tool, by means of which the locking pin 12 can be pulled out again when required.

Although the present invention has been described and illustrated in detail, it is to be clearly understood that the same is by way of illustration and example only, and is not to be taken by way of limitation. The spirit and scope of the present invention are to be limited only by

WHAT IS CLAIMED:

1. Plug for a bearing of an autohoist arm on a motor vehicle body having an elastic receiving means located in a receiving orifice and supported on a body surface of the motor vehicle and a dimensionally stable spacer means positioned in front of the receiving means comprising;
   snap fit connection means for connecting the spacer means to the receiving means;
   retention peg means for securing the receiving means and the spacer means to the receiving orifice, the retention peg means being insertable into an axial bore in the receiving means and the spacer means;
   inner radially projecting means at an inner end of the retention peg means for engaging behind the receiving means and an edge of the receiving orifice, the inner radially projecting means being elastically deformable for insertion through the axial bore;
   outer radially projecting means at an outer end of the retention peg means for engaging a stop in the spacer means for positioning the retention peg relative to the receiving means and the spacer means; and
   a locking pin means for preventing elastic deformation of the inner radial projecting means of the retention peg means, the locking pin means being press fitted into a bore of the retention peg means.

2. Plug according to claim 1, wherein the snap fit connection means comprises nose means formed on the spacer means for retention in cutout means of the receiving means.

3. Plug according to claim 1, wherein the locking pin means is pressed frictionally into the bore of the receiving means.

4. Plug according to claim 1, wherein the elastic deformation of the inner radially projecting means at the inner end of the retention peg means is made possible by tapering material cutouts formed axially in a casing of the retention peg means in an inner end region.

5. Plug according to claim 1, wherein the locking pin mean has an outer endpiece mean, for forming a plane transition to a surface of the spacer means.

6. Plug according to claim 5, wherein a bore orifice of the bore of the retention peg is filled by the outer endpiece means of the locking pin means.

7. Plug according to claim 5, wherein an undercut for engaging a pulling-off tool is made in the outer endpiece means of the locking pin means.

8. Plug according to claim 1 wherein an outer endpiece means for resting against an end face of the retention peg is formed on the locking pin means.

9. Plug according claim 1, wherein the locking pin means is connected integrally to the retention peg means and at a connection region between the locking pin means and the retention peg means can be separated and pressed into the bore of the retention peg means.

10. Plug according to claim 1, wherein during preassembly, the inner radially projection means at the inner end of the retention peg means is secured in a region of transition between the spacer means and the receiving means, in an encircling notch bevelled off from the axial bore.

* * * * *